United States Patent [19]
Vanderberg et al.

[11] 3,719,886
[45] March 6, 1973

[54] SPEED INDICATING SYSTEM FOR AN AUTOMOTIVE VEHICLE

[75] Inventors: Lawrence J. Vanderberg, Ann Arbor; John L. Wenzel, Livonia, both of Mich.

[73] Assignee: Ford Motor Company, Dearborn, Mich.

[22] Filed: Dec. 31, 1970

[21] Appl. No.: 103,214

[52] U.S. Cl..................324/167, 324/78 R, 324/161, 324/175
[51] Int. Cl..........G01p 3/36, G01p 3/56, G01r 23/02
[58] Field of Search......324/161, 163, 165, 166, 167, 324/168, 171, 173, 174, 175, 78 J, 78 E, 78 N, 82, 78 R

[56] References Cited

UNITED STATES PATENTS

| | | | |
|---|---|---|---|
| 3,447,076 | 5/1969 | Dotto | 324/167 |
| 2,957,135 | 10/1960 | Gray | 324/78 R |
| 3,175,152 | 3/1965 | Shafer | 324/175 |

*Primary Examiner*—Alfred E. Smith
*Attorney*—John R. Faulkner and Keith L. Zerschling

[57] ABSTRACT

A speed indicating system for an automotive vehicle, including a display means for displaying the speed of the vehicle, which is driven by an electrical motor. Means are coupled to a rotatable part of the vehicle and to the electric motor for driving the electric motor at a speed which has a fixed ratio with respect to the speed of the rotatable part of the automotive vehicle. This last mentioned means includes speed sensing means for sensing the speed of the electric motor and locking the speed of the electric motor to the fixed ratio with respect to the speed of the rotatable part of the automotive vehicle.

3 Claims, 3 Drawing Figures

INVENTORS
LAWERENCE J. VANDERBERG
JOHN L. WENZEL
BY
John R. Faulkner
Keith L. Zerschling
ATTORNEYS

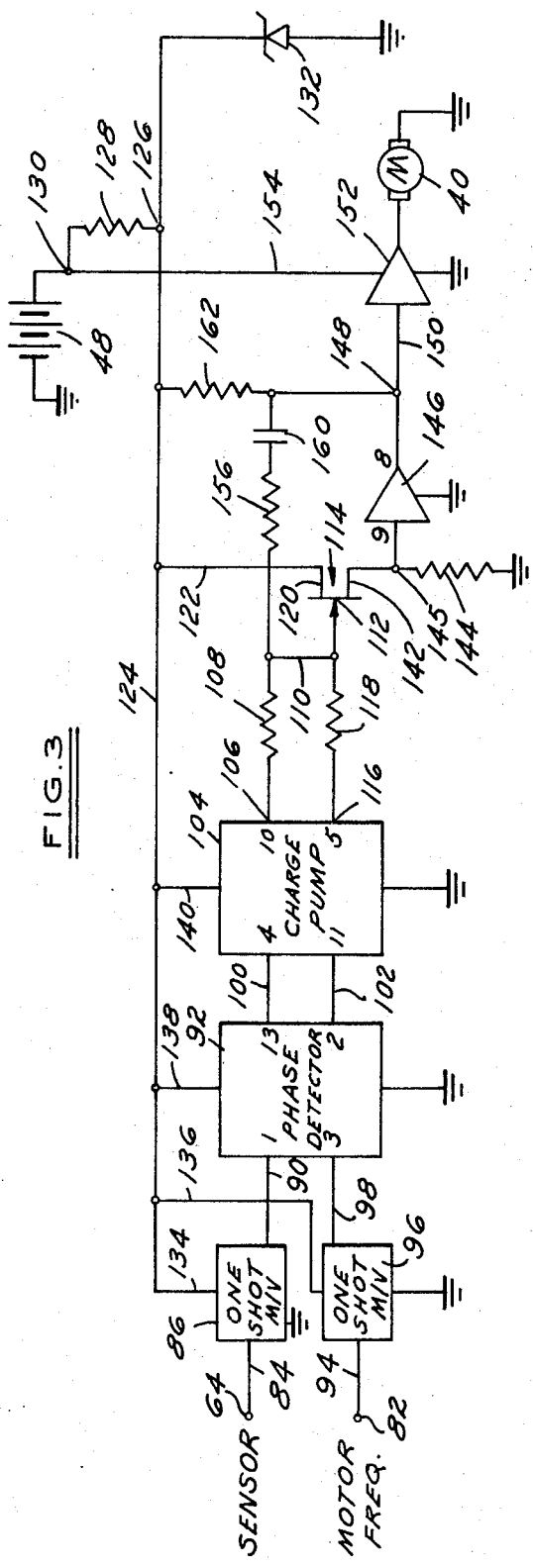
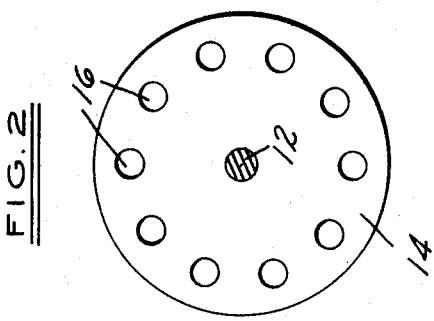

SPEED INDICATING SYSTEM FOR AN AUTOMOTIVE VEHICLE

BACKGROUND OF THE INVENTION

This invention relates to a speed indicating system for an automotive vehicle and, more particularly, to such a speed indicating system in which the speed display means in the form of a speedometer is driven by an electric motor. The electric motor is driven at a speed which is locked into the speed of a rotatable part of the vehicle that is driven at a speed proportional to vehicle speed.

One of the principal problems and objections with present day mechanical speedometer systems involves the drive cable from the transmission of the vehicle to the head of the speedometer. In spite of many improvements in the construction of these drive cables, they still become kinked in handling either before or during installation. This kinking not only causes noisy drives and/or speedometer pointer flutter, but also often requires the replacement of these cables in the field.

It has been suggested that electrical systems be employed to replace the drive cable from the transmission to the speedometer head of the vehicle. These systems often employ an alternating current generator which is driven by the transmission of the vehicle and which is connected to a synchronous motor positioned to drive a speedometer pointer mechanism. This connection may be made by a number of wires routed between the generator at the transmission of the vehicle and the electric motor positioned in the instrument cluster. It has been found that this system, while offering certain advantages, also presents some problems in operation. With the use of a synchronous motor, if the power, for some reason, should be cut off to the motor, for example, by turning the ignition key to the off position momentarily when the vehicle is running, the motor will become completely unsynchronized with respect to the alternating current produced by the generator. As a result, after the temporary disruption of power to the motor, it will not lock in to the frequency of the alternating current produced by the generator and the vehicle must be brought to a complete stop before this can occur.

The present invention has been designed to overcome the disadvantages pointed out above with respect to both the mechanical speedometer system described and the electrical system described.

SUMMARY OF THE INVENTION

The present invention provides a means for producing an electrical signal which has a frequency proportional to the speed of the automotive vehicle. In the preferred form of the invention, this means may take the form of a light emitting diode positioned adjacent a photo diode with a disc-like shutter having a plurality of apertures positioned between these two elements. This disc is driven at a speed proportional to vehicle speed and, hence, the photo diode will produce the electrical signal having a frequency proportional to vehicle speed.

A DC shunt motor or a permanent magnet motor which has an output shaft speed proportional to the voltage applied to it, or the current through it, is connected to drive a conventional eddy current type speedometer head mechanism. The output shaft of the motor also has a disc-like apertured shutter connected to it, so that this shutter is driven at a speed equal to the speed of the electric motor. Another combination of a light emitting diode and a photo diode is positioned so that the apertured shutter rotates between these two elements. As a result, an electrical signal may be taken from the photo diode which has a frequency proportional to the speed at which the electrical motor is driven.

The signal from the first photo diode, which has a frequency proportional to the speed of the automotive vehicle and the signal taken from the second photo diode, which has a frequency proportional to the speed of the electric motor, are fed through one-slot multivibrator circuits to a phase detector which compares the phase of these two alternating current signals. The output of the phase detector is connected to a charge pump which produces a charge that is supplied to the control electrode or gate of a field effect transistor and that has a magnitude which is a function of the frequency of the signal produced or taken from the first mentioned photo diode. This charge pump also has the capability of changing the magnitude of the charge on the control or gate electrode of the field effect transistor in a direction to increase the conduction of the field effect transistor if the frequency of the first mentioned electrical signal is greater than the frequency of the second mentioned signal, and in a direction to decrease the conduction of the field effect transistor if the frequency of the first signal is less than the frequency of the second electrical signal.

The output electrodes of the field effect transistor are connected in circuit with the electric motor mentioned above after suitable amplification. In a permanent magnet motor, the output of the field effect transistor is fed after suitable amplification through the armature windings of the permanent magnet motor. Thus, the speed of the permanent magnet motor is a function of the charge on the gate electrode of the field effect transistor. Consequently, electric motor is driven at a speed which is proportional to the frequency of the output signal of the first mentioned photo diode which is in turn proportional to vehicle speed. In addition, the speed of this motor is locked into the speed of the rotating part of the vehicle which rotates at a speed proportional to vehicle speed, since the frequency of the two signals mentioned above are compared in the phase detector and an output signal is generated in the charge pump to generate a compensating or feedback signal at the control electrode of the field effect transistor to properly adjust the speed of the electric motor should it vary from the speed of the rotating part of the vehicle or, as can be readily realized, varies from a fixed ratio of the speed of the rotating part of the vehicle to the speed of the electric motor.

Thus, the present invention provides an extremely accurate means for indicating the speed of an automotive vehicle. In addition, this system eliminates the drive cable from the transmission of the vehicle to the speedometer head and obviates the various problems associated with prior art electrical speedometers.

An object of the present invention is the provision of an extremely accurate and reliable speedometer system for an automotive vehicle.

A further object of the invention is the provision of a speed indicating system for an automotive vehicle that is electrical or electronic in character and that eliminates many of the problems associated with prior art speed indicating systems.

Other object and attendant advantages of the present invention may be more readily realized as the specification is considered in connection with the attached drawings.

BRIEF DESCRIPTION OF THE DRAWINGS

FIG. 2 is a sectional view taken along the lines 2—2 of FIG. 1; and

FIG. 3 is an electrical schematic of a circuit connected to the output terminals shown in FIG. 1 to complete the speed indicating system of the present invention.

DESCRIPTION OF THE PREFERRED EMBODIMENT

Figure 1:
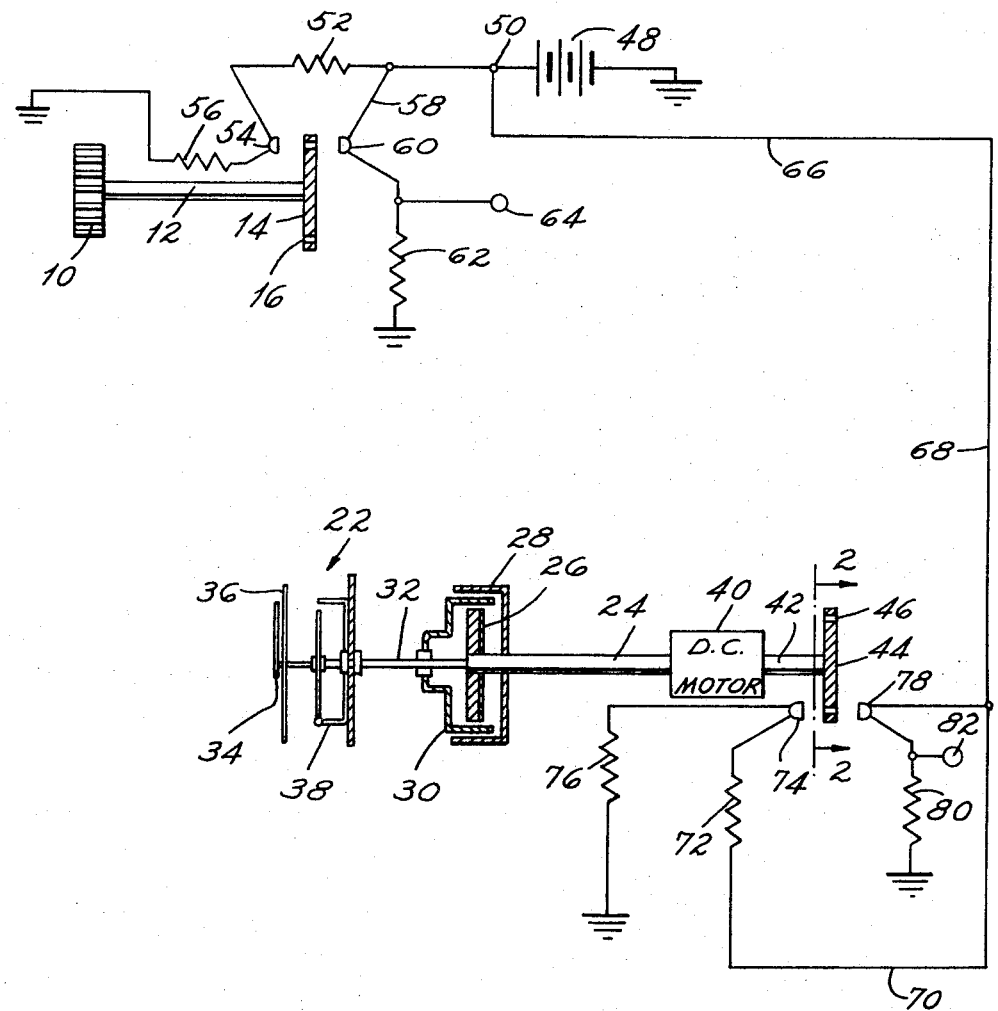
FIG. 1 is a schematic diagram of a portion of the speed indicating system of the present invention.

Referring now to the drawings in which like reference numerals designate like parts throughout the several views thereof, there is shown in FIG. 1 a gear 10 which is driven by a rotatable part of an automotive vehicle at a speed proportional to vehicle speed. To this end, the gear 10 may be suitably driven by a portion of the vehicle transmission that rotates at a speed proportional to vehicle speed. A shaft 12 may be suitably attached at one end to the gear 10 and at the other end to a disc-like apertured shutter 14 which has a plurality of apertures 16 positioned therein. For example, as shown in FIG. 2, the disc 14 may have 10 apertures 16 which are equally spaced circumferentially just inside the outer peripheral surface of the disc 14.

The speed display means 22 of the present invention may be conventional in character and may comprise a conventional eddy current cup speedometer having an input shaft 24 which drives a permanent magnet 26 and a radially spaced flux collecting member 28. An eddy current cup 30 is positioned radially between the permanent magnet 26 and the flux collecting member 28. This eddy current cup 30 has a shaft 32 affixed thereto which is rotatable supported in the input shaft 24 and which has connected thereto an indicator or pointer 34 positioned adjacent an indicia or dial 36 which is scaled in miles per hour. A hairspring 38 is connected to this shaft 32 to bias the shaft and, hence, the indicator 34 to the zero position. As is conventional in this type of speedometer mechanism, the pointer 34 will be moved, against bias of the hairspring 38, to a position which is proportional to the speed of the input shaft 24 by the magnetic forces developed in the eddy current cup 30. It can be readily appreciated that a conventional odometer (not shown) may be driven by the shaft 32 through suitable reduction gearing to indicate the distance traveled by the automotive vehicle.

A direct current motor 40 has an output shaft 42 which is connected at one end to the input shaft 24 of the speed display means or speedometer 22 and which is connected at the other end to a disc-like apertured shutter 44 which is similar to the disc-like apertured shutter 14 with apertures 16 driven by the gear 10. This disc-like apertured shutter 44 may be of the same size as the disc-like apertured shutter 14 and may have the same number, i.e., 10, apertures 46 positioned therein at equally spaced locations just inside the outer peripheral surface thereof.

A source of electrical energy in the form of storage battery 48 has its negative terminal connected to ground and its positive terminal connected to a junction 50. The junction 50, in turn, is connected through a resistor 52 to the anode of a light emitting diode 54. The cathode of the light emitting diode 54 is connected to ground by a resistor 56. The junction 50 also is connected by a lead 58 to the anode of a photo diode 60. The cathods of the photo diode 60 is connected to ground via resistor 62, and an output line or terminal 64 is connected intermediate the cathods of the photo diode 60 and the resistor 62.

Similarly, the junction 50 is connected through leads 66, 68, 70, and resistor 72 to the anode of a light emitting diode 74. The cathode of the light emitting diode 74 is connected to ground via resistor 76. The anode of a photo diode 78 is connected to junction 50 through leads 66, 68, and 79 and the cathode thereof is connected to ground via resistor 80. An output terminal or line 82 is connected intermediate the cathode of the photo diode 78 and the resistor 80.

It can readily be appreciated that an electrical signal will appear at the output terminal 64 connected to photo diode 60 which has a frequency proportional to vehicle speed, since the apertured shutter 14 is driven at a speed proportional to vehicle speed by the gear 10 and the shaft 12. Similarly, an electrical signal will appear at the output terminal 82 connected to the photo diode 78 which has a frequency proportional to the speed of the DC motor 40, since the apertured shutter 44 is driven by the DC motor via the output shaft 42.

The output terminal 64 is connected, as shown in FIG. 3, through lead 84 to a one-shot multivibrator 86, and the output of this one-shot multivibrator 86 is connected through lead 90 to one input terminal of a phase detector 92. Similarly, the output terminal 82 is connected through lead 94 to a second one-shot multivibrator 96 and the output of this one-shot multivibrator 96 is, in turn, connected through lead 98 to the other terminal of phase detector 92. The phase detector 92 is, in turn, connected through leads 100 and 102 to a charge pump 104, and this charge pump has one output terminal 106 connected through resistor 108 and lead 110 to the control or gate electrode 112 of a field effect transistor 114. The other output terminal 116 of the charge pump 104 is connected through resistor 118 to the control or gate electrode 112 of the field effect transistor 114. One output electrode 120 of field effect transistor 114 is connected via lead 122 to a line 124. The line 124 is, in turn, connected to the positive terminal of the source of electrical energy or storage battery 48 via junction 126, resistor 128, and junction 130. A zener diode 132, having a selected zener breakdown voltage, for example, 5 volts, has its cathode connected to junction 126 and, hence, line 124, and its anode connected to ground. This supplies the line 124 with a regulated voltage equal to the zener breakdown voltage of zener diode 132, for example, a regulated voltage of 5 volts.

The one-shot multivibrator 86, the one-shot multivibrator 96, the phase detector 92, and the charge pump 104 are supplied with power from the line 124 at the regulated supply voltage, for example, 5 volts, through leads 134, 136, 138, and 140, respectively.

The other output electrode 142 of the field effect transistor 114 is connected to ground via resistor 144. The output voltage of the field effect transistor 114 appearing across the resistor 144 is fed via terminal 145 to an amplifier 146 and the output of this amplifier, in turn, is fed via junction 148 and lead 150 to the input of another amplifier 152. The power for this amplifier is supplied directly from the positive terminal of the source of electrical energy or storage battery 38 via junction 130 and lead 154. The output of the amplifier 152 is fed to the armature winding of the direct current electrical motor 40. In addition, an RC feedback network comprised of a resistor 156 and a capacitor 160 is connected between the output junction or terminal 148 of the amplifier 146 and the control or gate electrode 112 of the field effect transistor 114. Additionally, a register 162 is connected to the output terminal 148 of the amplifier 146 and it serves as a load resistor for the last stage of the active element contained in the amplifier 146.

The phase detector 92, charge pump 104, and the amplifier 146 are contained within an electronic device which may be purchased from Motorola Semi-Conductor Products, Inc. and carries its identifying number MC4044-P. This device is shown and described in a specification sheet included in its Microelectronics Data Book 2nd Ed. Supplement 2 dated Sept. 1970. The numbers shown on the block diagram of FIG. 3, i.e., Nos. 1, 2, 3, and 13 on the phase detector, Nos. 4, 5, 10 and 11 on the charge pump, and Nos. 9 and 8 on the amplifier, represent the pin numbers of the electronic device MC4044-P described above and indicate how one skilled in the art may connect this electronic device to form a proper operating circuit for the speedometer system of the present invention.

In the operation of the present invention, if it is assumed that the vehicle is at rest, the gear 10 and, hence, the shutter 14 will be at rest and the DC motor 40 will not be energized; hence, the shutter 44 will be at rest. When the vehicle commences to move, the gear 10 will be rotated at a speed proportional to vehicle speed and, hence, will rotate the shutter 14 at a speed proportional to vehicle speed. The apertures 16 will then be rotated between the light emitting diode 54 and the photo diode 60 at a speed proportional to vehicle speed and, hence, the light from the photo diode 54 will be chopped at a frequency proportional to vehicle speed. Consequently, the photo diode 60 will alternately be in a conducting and nonconducting state at a frequency proportional to vehicle speed and an output signal will appear at the output terminal 64 which has a frequency proportional to vehicle speed.

It is preferred in the invention to employ the apertured shutter 14 together with light emitting diode 54 and photo diode 60, and the apertured shutter 44 together with light emitting diode 74 and photo diode 78 to produce the two signals which have respectively a frequency proportional to vehicle speed and a frequency proportional to the speed of the electric motor 40. Other means may be employed, however, which will occur to those skilled in the art, to produce these two signals having these two frequencies.

The signal from the output terminal 64 is then fed through one-shot multivibrator 86 into the phase detector 92, and since no input is being received from the terminal 82, the phase detector 92 will supply a signal to the charge pump 104, which, in turn, produces at the control or gate electrode 112 of the field effect transistor 114 a voltage or charge which is a function of the maximum error signal which the phase detector 92 produces. The voltage or charge on the control electrode 112 of the field effect transistor 114 will therefore be amplified by the field effect transistor 114 and will appear in amplified form at the terminal 145 where it is further amplified by the amplifiers 146 and 150 before being fed to the DC motor 40.

The DC motor 40, therefore, receives a voltage or current which is a function of this maximum error signal from the phase detector 92. This provides sufficient current or voltage to the DC motor to cause it to start and to commence rotating. As the DC motor rotates, a signal appears at the output terminal 82 connected to photo diode 70 which has a frequency proportional to the speed of the DC motor 40 as a result of the rotation of apertured shutter 44. This occurs by an action similar to that described in connection with light emitting diode 54, photo diode 60, and shutter 14. This signal is then fed to the phase detector 92 via the one-shot multivibrator 96, and the phase of the signal from the one-shot multivibrator 96 is then compared to the phase of the signal coming from the one-shot multivibrator 86.

The phase detector 92 will then produce an output signal which will act through the charge pump 104, the field effect transistor 114, and the amplifier 146 to cause an output voltage from the amplifier 152 to control the speed of the DC electric motor 40, such that the output signal appearing at the output terminal 82 is phase locked with respect to the frequency of the signal appearing at the output terminal 64. When this phase-locked condition prevails, the output voltage of the amplifier 152 is a function of the speed of the automotive vehicle and, hence, the motor 40 is driven at a speed which is a function of the speed of the automotive vehicle. As a result of the above-described action, the indicator 34 of the speedometer 22 will be moved on the scale 36 to indicate the speed of the vehicle.

When the vehicle has reached some steady state speed, the charge on the control or gate electrode 112 of field effect transistor 114 emanating from the charge pump 104 will be such as to energize the DC electric motor 40 with a voltage or current which will drive the speedometer mechanism 22 to indicate this speed. Should the DC motor 40, for some reason, for example, as a result of line voltage change, windage, friction, etc., run at a speed which produces an electrical signal at the output terminal 82 which has a frequency that is not equal to the frequency of the signal produced at the output terminal 64, the phase detector 92, and the charge pump 104 will adjust the level of the voltage or charge appearing on the control electrode 112 of field effect transistor 114 to bring the motor speed back into the proper phase lock relationship, i.e., so that it runs at the same speed as the speed of the gear 10, shaft 12 and shutter 14. It can be readily realized that the above condition will prevail if the shutters 14 and 44 are of the same size and have the same number of apertures 16 and 46 located therein. On the other hand, the discs 14 and 44 could be arranged so that the output frequency at the terminal 82 is some fixed ratio with respect to the frequency of the signal appearing at the output terminal 64 so that the DC motor 40 runs at a speed that has a fixed ratio with respect to the speed of gear 10. In that case then, an electronic frequency multiplier or frequency divider could be connected between the output terminal 82 and the input to the one-shot multivibrator 96. On the other hand, mechanical means could be provided, for example, speed change gears or a modified shutter 44 to permit the DC electric motor 40 to operate at a speed which has a fixed ratio with respect to the speed of the gear 10.

Should the frequency of the signal appearing at the output terminal 82 during steady state operations fall below the frequency appearing at the output terminal 64, the phase detector 92 and the charge pump 104 will produce additional charge or voltage at the control electrode 112 of the field effect transistor 114, thereby increasing the current or voltage supplied to the DC motor 40 to cause its speed to increase until the frequency of the signals appearing at the output terminals 64 and 82 as shown in FIG. 1 are equal. On the other hand, should the signal appearing at the output terminal 82 under steady state conditions have a frequency higher than the frequency of the signal appearing at the output terminal 64 as shown in FIG. 1, the phase detector 92 and the charge pump 104 will produce a lower voltage or charge at the control or gate electrode of the field effect transistor 114, to thereby decrease the current or voltage supplied to the DC motor 40. This reduces the speed of the DC motor 40 and, hence, decreases the frequency of the signal appearing at the output terminal 82. This action will continue until the frequencies appearing at the output terminals 82 and 64 are equal.

In the present invention, the system provides a signal for the DC motor which is a function of the vehicle speed and also supplies to the DC motor an adjusting or compensating signal which, in combination with the circuit shown in FIG. 3, will drive the DC motor at a speed which is equal to the speed of a rotatable part of an automotive vehicle which is driven at a speed proportional to vehicle speed, or at some fixed ratio with respect thereto, should that be desired.

Thus, the present invention provides a very accurate and reliable speed indicating system for an automotive vehicle.

We claim:

1. In a speed indicating system for an automotive vehicle the combination comprising means for producing an electrical signal having a frequency proportional to vehicle speed, means coupled to said first mentioned means for producing a voltage having a magnitude which is a function of the frequency of said electrical signal, an electric motor, a vehicle speed display means driven by said electric motor, said electric motor including means for receiving said voltage and driving said motor at a speed proportional thereto, means for producing an electrical signal having a frequency proportional to the speed of said electric motor, said second mentioned means being coupled to said last mentioned means and including means for adjusting said voltage to drive said electric motor at a speed where the frequency of said second mentioned electrical signal is equal to the frequency of said first mentioned electrical signal, said means for producing an electrical signal having a frequency proportional to vehicle speed comprising a shutter having a plurality of spaced apertures positioned therein, said shutter driven by a rotatable part of the automotive vehicle that rotates at a speed proportional to vehicle speed, a light emitting means positioned on one side of said shutter and a light sensitive means producing electrical energy when light falls thereon positioned on the other side of said shutter, said means for producing an electrical signal having a frequency proportional to the speed of said electric motor comprising a shutter having a plurality of apertures positioned therein driven by said electrical motor, a light emitting means positioned on one side of said shutter and a light sensitive means producing electrical energy when light falls thereon positioned on the other side of said shutter, said second mentioned means comprising phase detecting means for comparing the phase of said first mentioned electrical signal with the phase of said second mentioned electrical signal, charge producing means coupled to said phase detecting means, and a field affect transistor having a control electrode coupled to said charge producing means and output electrodes coupled to said electric motor.

2. In a speed indicating system for an automotive vehicle the combination comprising, a speed display means, said speed display means having a moveable indicator, an electric motor having an output shaft connected to said speed display means, said speed display means including means for displacing said moveable indicator as a function of the speed of said output shaft, means coupled to said output shaft for producing a first electrical signal having a frequency proportional to the speed of said output shaft, means coupled to a rotatable part of said automotive vehicle for producing a second electrical signal having a frequency proportional to vehicle speed, a phase detector connected to receive said first and second electrical signals, a charge producing means coupled to said phase detector, a source of electrical energy, a field effect transistor having output electrodes connected in circuit with said source of electrical energy and said electric motor for supplying electrical energy to said electric motor having a magnitude that is a function of the conduction of current through said output electrodes, said field effect transistor having a control electrode, said charge producing means coupled to said control electrode and including means for producing a charge on said control electrode having a magnitude which is a function the frequency of said second electric signal and for changing the magnitude of the charge in a direction to increase the conduction of said field effect transistor if the frequency of said first electrical signal is less than the frequency of said second signal and in a direction to decrease the conduction of said field effect transistor if the frequency of said first electrical signal is greater than the frequency of said second electrical signal.

3. The combination of claim 2 in which said means coupled to said output shaft of said electric motor for producing said first electrical signal and said means coupled to said rotatable part of said automotive vehicle for producing said second electrical signal each comprise a shutter having a plurality of spaced apertures positioned therein, a light emitting means positioned to emit light through said apertures and a light sensitive means for producing electrical energy when light emitted from said light producing means through said apertures falls on said light sensitive means.

* * * * *